(12) United States Patent
Liu et al.

(10) Patent No.: US 9,513,790 B2
(45) Date of Patent: *Dec. 6, 2016

(54) ELECTRONIC DEVICE AND METHOD FOR UNLOCKING SCREEN OF ELECTRONIC DEVICE

(71) Applicant: HUAWEI DEVICE CO., LTD., Shenzhen (CN)

(72) Inventors: Zhu Liu, Shenzhen (CN); Zhiyong Zhang, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 56 days.

This patent is subject to a terminal disclaimer.

(21) Appl. No.: 14/584,343

(22) Filed: Dec. 29, 2014

(65) Prior Publication Data

US 2015/0113481 A1 Apr. 23, 2015

Related U.S. Application Data

(63) Continuation of application No. PCT/CN2014/071766, filed on Jan. 29, 2014.

(30) Foreign Application Priority Data

Feb. 6, 2013 (CN) .......................... 2013 1 0047530

(51) Int. Cl.
*G06F 7/04* (2006.01)
*G08B 29/00* (2006.01)
(Continued)

(52) U.S. Cl.
CPC ......... *G06F 3/04847* (2013.01); *G06F 3/0485* (2013.01); *G06F 3/0488* (2013.01);
(Continued)

(58) Field of Classification Search
CPC .......... G06F 21/31; G06F 21/36; H04L 63/08; H04L 63/083
(Continued)

(56) References Cited

U.S. PATENT DOCUMENTS 7,657,849 B2 2/2010 Chaudhri et al.
8,209,637 B2 6/2012 Chaudhri et al.
(Continued)

FOREIGN PATENT DOCUMENTS

CN 1846188 10/2006
CN 101499905 8/2009
(Continued)

OTHER PUBLICATIONS

International Search Report mailed May 9, 2014, in corresponding International Patent Application No. PCT/CN2014/071766.
(Continued)

*Primary Examiner* — Aravind Moorthy
(74) *Attorney, Agent, or Firm* — Staas & Halsey LLP

(57) ABSTRACT

A method for unlocking a screen of the electronic device are provided. The method includes: detecting, in a screen-locked state, intent of a user to unlock the screen; if it is detected that the user intends to unlock the screen, extracting contact information from the storage unit of the electronic device, where the extracted contact information includes a first attribute value and second attribute values; displaying the first attribute value of the extracted contact information on the screen and displaying the second attribute values in a selectable manner; and detecting an operation of choosing a second attribute value by the user, and comparing the second attribute value chosen by the user with a second attribute value that is in the storage unit and corresponding
(Continued)

to the displayed first attribute value; if the two values are the same, unlocking the screen; and otherwise, maintaining the screen-locked state.

20 Claims, 19 Drawing Sheets

(51) Int. Cl.
| | |
|---|---|
| *H04L 9/32* | (2006.01) |
| *G06F 21/00* | (2013.01) |
| *G06F 3/0484* | (2013.01) |
| *G06F 3/0488* | (2013.01) |
| *G06F 3/0485* | (2013.01) |
| *G06F 21/36* | (2013.01) |
| *H04L 29/06* | (2006.01) |
| *G06F 21/31* | (2013.01) |

(52) U.S. Cl.
CPC .......... *G06F 3/04842* (2013.01); *G06F 21/36* (2013.01); *G06F 21/31* (2013.01); *G06F 2221/2103* (2013.01); *H04L 63/08* (2013.01); *H04L 63/083* (2013.01)

(58) Field of Classification Search
USPC .............................. 726/19, 34; 713/168, 182
See application file for complete search history.

(56) References Cited

U.S. PATENT DOCUMENTS

| | | | |
|---|---|---|---|
| 2005/0010768 | A1 | 1/2005 | Light et al. |
| 2007/0150826 | A1 | 6/2007 | Anzures et al. |
| 2009/0199295 | A1 | 8/2009 | Shih et al. |
| 2010/0180336 | A1 | 7/2010 | Jones et al. |
| 2010/0248688 | A1 | 9/2010 | Teng et al. |
| 2010/0306718 | A1 | 12/2010 | Shim et al. |
| 2011/0205163 | A1 | 8/2011 | Hinckley et al. |
| 2011/0246951 | A1 | 10/2011 | Chen |
| 2013/0027433 | A1* | 1/2013 | Hand ...................... G06F 3/048 345/650 |
| 2013/0122866 | A1 | 5/2013 | Huang |
| 2014/0189603 | A1* | 7/2014 | Adams ................ G06F 3/04883 715/863 |

FOREIGN PATENT DOCUMENTS

| | | |
|---|---|---|
| CN | 102096546 | 6/2011 |
| CN | 102207809 | 10/2011 |
| CN | 102609199 | 7/2012 |
| CN | 10288449 | 1/2013 |
| CN | 103019599 | 4/2013 |
| CN | 103034414 | 4/2013 |
| CN | 103076959 | 5/2013 |

OTHER PUBLICATIONS

Chinese Office Action dated Dec. 31, 2014 in corresponding Chinese Patent Application No. 201310047530.7.
Chinese Search Report dated Dec. 18, 2014 in corresponding Chinese Patent Application No. 2013100475307.
PCT International Search Report dated May 9, 2014 in corresponding International Patent Application No. PCT/CN2014/071766.
Chinese Office Action and Search Report dated Jul. 9, 2015 in corresponding Chinese Patent Application No. 201310047530.7.
Wu, "Electronic government application guide", Party building Books Publishing House, Aug. 30, 2003, 2 pp. (Translation: 2pp.).
Amras et al., "Computer security principle", China machine press, Jan. 31, 2002, 3 pp. (Translation: 2 pp.).

* cited by examiner

ELECTRONIC DEVICE AND METHOD FOR UNLOCKING SCREEN OF ELECTRONIC DEVICE

CROSS-REFERENCE TO RELATED APPLICATIONS

This application is a continuation of International Application No. PCT/CN2014/071766, filed on Jan. 29, 2014, which claims priority to Chinese Patent Application No. 201310047530.7, filed on Feb. 6, 2013, both of which are hereby incorporated by reference in their entireties.

TECHNICAL FIELD

The present invention relates to an electronic device that has a touchscreen, and in particular, to a method for unlocking a screen of an electronic device that has a touchscreen.

BACKGROUND

As communications technologies develop, portable electronic products increasingly become a part of people's daily life. In a bus or subway, in a café, even among a group of people walking in haste, it can be seen at any time that people are using mobile electronic products such as mobile phones or tablet computers. These mobile electronic products have one common characteristic, that is, they have a touch-controlled or touch-style screen. On one hand, the screen is used to display texts and pictures; and on the other hand, the screen helps a user perform an operation, such as starting an application program, inputting a text, or triggering a function, on an electronic product by means of touching or tapping.

Because a manner such as touching can immediately start a function or program on the electronic products, a user needs to lock a touchscreen when these electronic products are not in use, so as to prevent mis-operation or start of some unexpected functions by mistake. When these electronic products are used next time, the user needs to unlock the screen before performing an operation.

There are many manners of unlocking a screen, for example, inputting numerics or letters in a specific arranging manner. However, this manner is relatively complex because the user needs to first create a group of personal passwords and memorize it, and then input it when unlocking the screen. This reduces usability of an unlocking process, and accordingly reduces usability of a mobile electronic product. Another common manner of unlocking a touchscreen is a slide-to-unlock manner developed by Apple. Content of this manner is that a preset image such as a slider is displayed on a screen, and when a user drags the slider a specific distance to a specified position, the screen is unlocked. This manner is easy to use, but everyone knows an unlocking process, so that security of information in a mobile electronic product is susceptible to damage.

SUMMARY

To resolve the foregoing problem in the prior art, a purpose of the present invention is to provide a method for unlocking a screen of an electronic device, which can on one hand help a user unlock the screen, and on the other hand ensure that information in the electronic device is secure to a certain extent.

An implementation manner of the present invention provides a method for unlocking a screen of an electronic device, where the electronic device includes the screen and a storage unit, and the method for unlocking a screen of an electronic device includes: detecting, in a screen-locked state, intent of a user to unlock the screen; if it is detected that the user intends to unlock the screen, extracting contact information from the storage unit of the electronic device, where the extracted contact information includes a first attribute value and second attribute values; displaying the first attribute value of the extracted contact information on the screen and displaying the second attribute values in a selectable manner; and detecting an operation of choosing a second attribute value by the user, and comparing the second attribute value chosen by the user with a second attribute value that is in the storage unit and corresponding to the displayed first attribute value; if the two values are the same, unlocking the screen; and otherwise, maintaining the screen-locked state.

As a further improvement of the present invention, the intent of the user to unlock the screen includes touching one or more physical keys on the electronic device.

As a further improvement of the present invention, the first attribute value and the second attribute value that are of the contact information include two of a name, a contact manner, a photo, and a relationship with the user.

As a further improvement of the present invention, the contact manner includes a phone number, an email address or an instant messaging number.

As a further improvement of the present invention, the displayed first attribute values and second attribute values of multiple pieces of contact information are not quantitatively symmetric.

As a further improvement of the present invention, the selectable manner includes a manner of a rolling wheel (rolling wheel).

As a further improvement of the present invention, an input of choosing a second attribute value by the user includes touching the rolling wheel, where the rolling wheel produces a rolling effect and sequentially displays the extracted second attribute values, where the input further includes tapping a to-be-chosen second attribute value when the to-be-chosen second attribute value is displayed on the screen.

As a further improvement of the present invention, the selectable manner includes a manner of a drop down menu (Drop Down Menu).

As a further improvement of the present invention, an input of choosing a second attribute value by the user includes tapping the drop down menu, where the drop down menu displays the extracted second attribute values in a list, where the input further includes tapping a second attribute value that is displayed in the drop down menu and is to be chosen by the user.

As a further improvement of the present invention, the contact information extracted from the storage unit of the electronic device further includes third attribute values, where the third attribute values are displayed with the second attribute values in pairs.

As a further improvement of the present invention, when the electronic device is in the screen-locked state, preventing the electronic device from responding to any touch, on the screen, that is not corresponding to an action of inputting a second attribute value.

As a further improvement of the present invention, the contact information is extracted from a predetermined contact group.

An implementation manner of the present invention further provides an electronic device, where the electronic device includes a storage unit, one or more processing units, and one or more modules, where the one or more modules are stored in the storage and configured to be executed by the one or more processors; and the one or more modules include: an action recognizing module, configured to detect intent of a user to unlock a screen; an information invoking module, configured to, when it is detected that the user intends to unlock the screen, extract contact information from the storage unit, where the extracted contact information includes a first attribute value and second attribute values; a graph processing module, configured to display the first attribute value of the extracted contact information on the screen and prompt the user to input a second attribute value, where the action recognizing module is further configured to detect an input of the user; a determining module, configured to compare and determine whether the input of the user is the same as a second attribute value that is in an address book and corresponding to the displayed first attribute value; and an executing module, configured to unlock the screen when the determining module determines that the input of the user is the same as the second attribute value; and otherwise, keep the electronic device in a screen-locked state.

According to the electronic device and the method in the implementation manners of the present invention, an unlocking solution is designed by extracting information that is stored by a user in an electronic device, and meanwhile, unlocking difficulty for an unauthorized user is increased based on ignorance of the unauthorized user about the information stored in the electronic device, thereby not only ensuring unlocking convenience for the authorized user, but also improving security of the information in the electronic device to some extent.

DESCRIPTION OF EMBODIMENTS

An unlocking method in the present invention can be applied to various electronic apparatuses that have a touch-screen. The following uses an electronic apparatus that executes the unlocking method to describe specific implementation manners. To comprehensively understand the present invention, description of the following specific implementation manners involves many technical details. However, a person skilled in the art should understand that the present invention may be implemented without requiring these specific details. In other implementation manners of the present invention, a commonly-known method, process, component, and circuit are not described in detail, so as to avoid unnecessarily limiting, shrinking or confusing the implementation manners.

Figure 1:
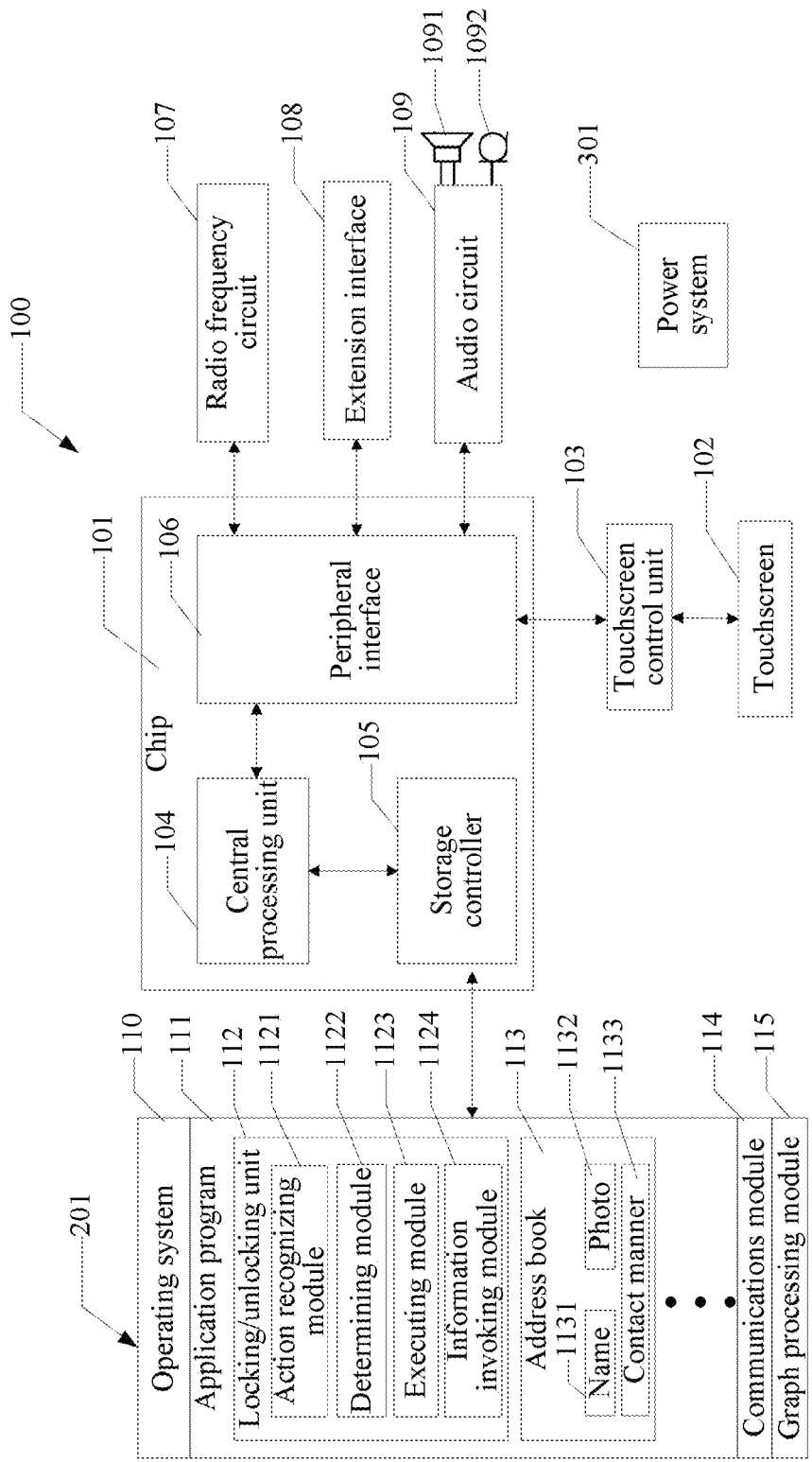
FIG. 1 is a schematic diagram of a system architecture of an electronic device according to some implementation manners of the present invention.

FIG. 1 is an electronic device 100 according to a specific implementation manner of the present invention. The electronic device 100 includes components such as a touchscreen 102, a touchscreen control unit 103, a central processing unit 104, a storage controller 105, a peripheral interface 106, a radio frequency circuit 107, an extension interface 108, an audio circuit 109, and a storage unit 201. These components communicate with each other through one or more buses 10. In this implementation manner of the present invention, the electronic device 100 may be any mobile or portable electronic device, including but not limited to a mobile phone, a mobile computer, a tablet computer, a personal digital assistant (Personal Digital Assistant, PDA), a media player, a smart TV set, a combination of two or more of the foregoing devices, and the like.

In this implementation manner of the present invention, the central processing unit 104 may consist of a single packaged integrated circuit, and may also consist of multiple packaged integrated circuits that are connected to each other. The central processing unit 104 is configured to process data and execute an application program. The peripheral interface 106 electrically connects external devices such as an input device and an output device that are of the electronic device 100 to the central processing unit 104 and the storage unit 201. The central processing unit 104 runs various software programs and/or instruction sets that are stored in the storage unit 201, so as to execute various functions of the electronic device 100 and process data.

In some implementation manners of the present invention, the central processing unit 104, the storage controller 105 and the peripheral interface 106 may be implemented on a single chip such as a chip 101. However, in some other implementation manners, the central processing unit 104, the storage controller 105 and the peripheral interface 106 may be implemented on multiple independent chips.

The storage unit 201 may include a random access memory (Random Access Memory, RAM for short), a nonvolatile memory (Nonvolatile Memory), a mass storage device (Mass Storage Device, such as microdrive) or a combination thereof. The nonvolatile memory includes an electrically erasable programmable read-only memory (Electrically Erasable Programmable Read-Only Memory, EEPROM), a flash memory (Flash Memory), and the like. In some other implementation manners, the storage 201 may further include a storage that is far away from one or more central processing units 104, for example, a network attached storage (Network attached Storage, NAS) accessed via the radio frequency circuit 107 or the peripheral interface 106, and a communications network (not illustrated). The communications network may be the Internet (Internet), one or more intranets (Intranet), a local area network (Local Area Network, LAN), a wide area network (Wide Area Network, WAN), a storage area network (Storage Area Network, SAN), or a proper combination of the foregoing networks. The storage controller 105 is configured to control access of the electronic components, such as the central processing unit 104 or the peripheral interface 106, of the electronic device 100 to the storage unit 201.

The radio frequency (RF) circuit 107 receives and sends an electromagnetic wave. The radio frequency circuit 107 converts an electrical signal into an electromagnetic wave signal, or converts an electromagnetic wave signal into an electrical signal, and communicates with the communications network and another communications device by using an electromagnetic wave signal. The radio frequency circuit 107 includes well-known circuits that are used to execute these functions, including but not limited to an antenna system, a radio frequency transceiver, one or more amplifiers, a tuner, one or more oscillators, a digital signal processor, a codec (Codec) chipset, a subscriber identity module (SIM) card, a storage, and the like. In this implementation manner of the present invention, the communications network that performs communication with the radio frequency circuit 107 includes the Internet, an intranet and/or a wireless network such as a cellular telephone network, a wireless local area network and/or a metropolitan area network (Metropolitan Area Network, MAN). The communication may be performed by using any one of multiple communications standards, protocols and technologies, including but not limited to Global System for Mobile Communications (GSM), Enhanced Data Rate for GSM Evolution (Enhanced Data Rate for GSM Evolution), Wideband Code Division Multiple Access (WCDMA), Code Division Multiple Access (CDMA), Time Division Multiple Access (TDMA), Bluetooth, Wireless Fidelity (Wi-Fi), Voice over Internet Protocol (VoIP), Worldwide Interoperability for Microwave Access (Worldwide Interoperability for Microwave Access, WiMAX), a protocol for email, instant messaging and/or short message service (SMS), or any other proper communications protocol, including a communications protocol that has not been developed when the present invention is completed.

The audio circuit 109, a loudspeaker 1091, and a microphone 1092 provide audio interfaces between a user and the electronic device 100. The audio circuit 109 receives audio data from the peripheral interface 106, converts the audio data into an electrical signal, and sends the electrical signal to the loudspeaker 1091. The loudspeaker 1091 converts the electrical signal into a sound wave that is audible by human. The audio circuit 109 further receives an electrical signal that is converted from a sound wave by the microphone 1092, converts the electrical signal into audio data and sends the audio data to the peripheral interface 106 for processing. The audio data may be retrieved by the peripheral interface 106 from the storage unit 201 and/or the radio frequency circuit 107, and/or sent to the storage unit 201 and/or the radio frequency circuit 107. In some other implementation manners of the present invention, the audio circuit 109 further includes an earphone or a headphone jack (not illustrated), which is configured to provide an interface between the audio circuit 109 and a detachable audio input/output peripheral (not illustrated). For example, the audio input/output peripheral may be an output-only headphone, and may also be a headset that has both an output (a single-earpiece or double-earpiece output headset) and an input (a microphone).

The touchscreen control unit 103 provides an interface between the touchscreen 102 of the electronic device 100 and the peripheral interface 106. The touchscreen 102 provides both an output interface and an input interface between the electronic device 100 and the user. The touchscreen control unit 103 receives/sends an electrical signal from/to the touchscreen 102, and the touchscreen 102 displays a visual output to the user. The visual output includes a text, a graph, a video, or a combination thereof. Some or all of the visual output may be corresponding to an object of a user interface, and the following describes more details of the visual output. In this implementation manner of the present invention, the touchscreen 102 includes a touch-sensitive surface that receives an input of the user, and the touch-sensitive surface is used to receive the input of the user based on a sense of touch and/or a tactile contact. In the following description, descriptions in different manners such as a screen, a touchscreen or a touch-controlled screen are all corresponding to the touchscreen 102, and details are not described herein again.

In this implementation manner of the present invention, the touchscreen 102 and the touchscreen controller 103 (along with any related software module and/or instruction set in the storage unit 201) detect a touch or proximity on the touchscreen 102 and any movement or discontinuity of the touch or proximity, and convert the detected touch or proximity into interaction with a user interface object such as one or more virtual keys displayed on the touchscreen. In this implementation manner of the present invention, a point that responds to the touch or proximity of the user on the touchscreen 102 is corresponding to one or more fingers of the user, or any proper object or accessory, such as a stylus. Technologies used in the touchscreen 102 include but are not limited to a liquid crystal display (LCD) technology, a laser phosphor display (LPD) technology, an in-plane switching (In-Plane Switching, IPS) technology, and a retina (Retina) screen technology. The touchscreen 102 and the touchscreen controller 103 may use any one of multiple touch-sensitive technologies to detect the touch or proximity and its movement or discontinuity. These touch-sensitive technologies include but are not limited to capacitance, resistance, infrared, and surface acoustic wave technologies, and other proximity sensor arrays, or other technologies that are used to determine one or more points making contact with the touchscreen 102.

The electronic device 100 further includes a power system 301 that is configured to supply power to various components. The power system 301 may include a power management system, one or more power supplies (such as a battery), a charging system, a power failure detection circuit, a power converter or inverter, a power status indicator (such as a light emitting diode), and any other component associated with generation, management, and distribution of electrical energy of the electronic device 100.

In this implementation manner of the present invention, the storage unit 201 stores software components or instruction sets that implement functions of the electronic device 100. The software component or the instruction set includes but is not limited to an operating system 110, various types of application program 111, a screen locking/unlocking unit 112, and an address book 113 that are shown in FIG. 1.

The operating system 110 includes various components and/or drivers that are used to control and manage routine system tasks such as memory management, storage device control, and power management, and facilitate communication between various software and hardware. In this implementation manner of the present invention, the operating system 110 may be Android of Google, iOS developed by Apple, Windows developed by Microsoft, or an embedded operating system such as Vxworks.

The application program 111 includes any application that is installed on the electronic device 100, including but not limited to a browser, an email, an instant messaging service, word processing, a virtual keyboard, a widget (Widget), encryption, digital rights management, speech recognition, voice replication, positioning (such as a function provided by the Global Positioning System), music playback, and the like. FIG. 1 shows only the screen locking/unlocking unit 112 and the address book 113 that will be described in detail in the following specific implementation manners of the present invention, and other existing and common applications and instruction sets are not shown.

The screen locking/unlocking unit 112 is configured to lock or unlock the screen according to an operating action and/or state of the user on the electronic device 100. Accordingly, the electronic device 100 includes a locked state and an unlocked state of the user interface. In some implementation manners of the present invention, the unlocked state includes states used for multiple applications.

In the locked state, the electronic device 100 is powered on and an operation can be performed. However, the majority of user inputs are ignored, that is, the electronic device 100 does not respond to user inputs to perform some user-expected operations. The expected operations may include navigation between user interfaces, and activation or deactivation of a predetermined function set. The locked state may be used to prevent unexpected or unauthorized use of the electronic device 100, or activation or deactivation of a function on the electronic device 100. The electronic device 100 in the locked state may be referred to as a locked electronic device 100. In some embodiments, the electronic device 100 in the locked state may respond to limited user inputs. These inputs include an input corresponding to an attempt to switch the electronic device 100 to an unlocked state of the user interface, or an input corresponding to powering off the electronic device 100. In other words, the locked electronic device 100 responds to a user input corresponding to an attempt to switch the electronic device 100 to an unlocked state of the user interface, and a user input corresponding to powering off the electronic device 100, but does not respond to a user input corresponding to an attempt to navigate between user interfaces. It should be understood that, even though the electronic device 100 ignores user inputs, when an input is detected, the device 100 may still provide the user with a sensory feedback (such as a visual, audio or vibration feedback) indicating that the input will be ignored. As an exception, in some implementation manners, the electronic device 100 in the locked state may respond to a user input for making an emergency call. For example, the user may start a dialing function of the electronic device 100 by triggering a predetermined key, so as to make the emergency call.

In the unlocked state, the electronic device 100 is in its normal working state, detects and responds to user inputs corresponding to interaction with the user interface. The electronic device 100 in the unlocked state may be referred to as an unlocked electronic device 100. The unlocked electronic device 100 detects and responds to user inputs used for navigation between user interfaces, data inputting, and function activation or deactivation. In an implementation manner in which the electronic device 100 includes the touchscreen 102, the unlocked electronic device 100 detects and responds to a touch or proximity that is executed by using the touchscreen 102 and is corresponding to navigation between user interfaces, data inputting, and function activation or deactivation.

In some specific implementation manners of the present invention, the screen locking/unlocking unit 112 includes an action recognizing module 1121, a determining module 1122, an executing module 1123 and/or an information invoking module 1124. For example, when the electronic device 100 is in the unlocked state, the action recognizing module 1121 is configured to monitor whether any one condition of one or more conditions for switching the electronic device 100 to the locked state is met. In some implementation manners, the condition includes but is not limited that the touchscreen 102 of the electronic device 100 does not detect a touch operation of the user in a specific period, or that the user triggers a specified screen locking key such as a physical on-off button, or a virtual key or key combination on the touchscreen 102. When the condition is met, the executing module 1123 invokes a corresponding instruction set to drive the electronic device 100 to enter a locked state. In some other implementation manners of the present invention, when the electronic device 100 is in the locked state, the action recognizing module 1121 monitors an operation of the user. When it is detected that an operation or a combination of operations of the user shows that the user has intent to unlock the electronic device 100, in some implementation manners of the present invention, the information invoking module 1124 invokes one or more pieces of contact information in the address book 113. Each piece of contact information at least includes attribute data of a contact, such as a contact name 1131, a contact photo 1132 and/or a contact manner 1133. The contact manner 1133 includes, for example, one or more of a phone number, an email address, and an instant messaging number. The invoked information is displayed on the touchscreen 102 in a manner shown in FIG. 2A to FIG. 2D. The user needs to correctly match a displayed photo and a corresponding contact name. In some specific implementation manners of the present invention, the action recognizing module 1121 recognizes a matching operation of the user and generates a result of contact photo and name matching. The determining module 1122 compares whether the matching result generated by the action recognizing module 1121 is consistent with a correspondence between the originally stored contact photo and name in the address book 113. If a consistency is determined, the executing module 1123 unlocks the screen 102 of the electronic device 100, and drives the electronic device 100 to enter the unlocked state; and otherwise then drives the electronic device 100 to enter the locked state.

A communications module 114 is configured to communicate with another device through one or more extension interfaces 108, and the communications module 114 includes various software components that process data that is received by the radio frequency circuit 107 and the extension interface 108. The extension interface 108, for example, a Universal Serial Bus (USB) interface, is suitable for direct coupling with another device, or indirect coupling with another device through a (wired or wireless) network.

A graph processing module 115 includes various known software components that are used to present and display a graph on the touchscreen 102. In this implementation manner of the present invention, the graph includes any object that can be displayed to the user, including but not limited to a text, a web page, an icon (such as a user interface object including a virtual keyboard), a digital image, a video, an animation, and the like.

Figure 2:
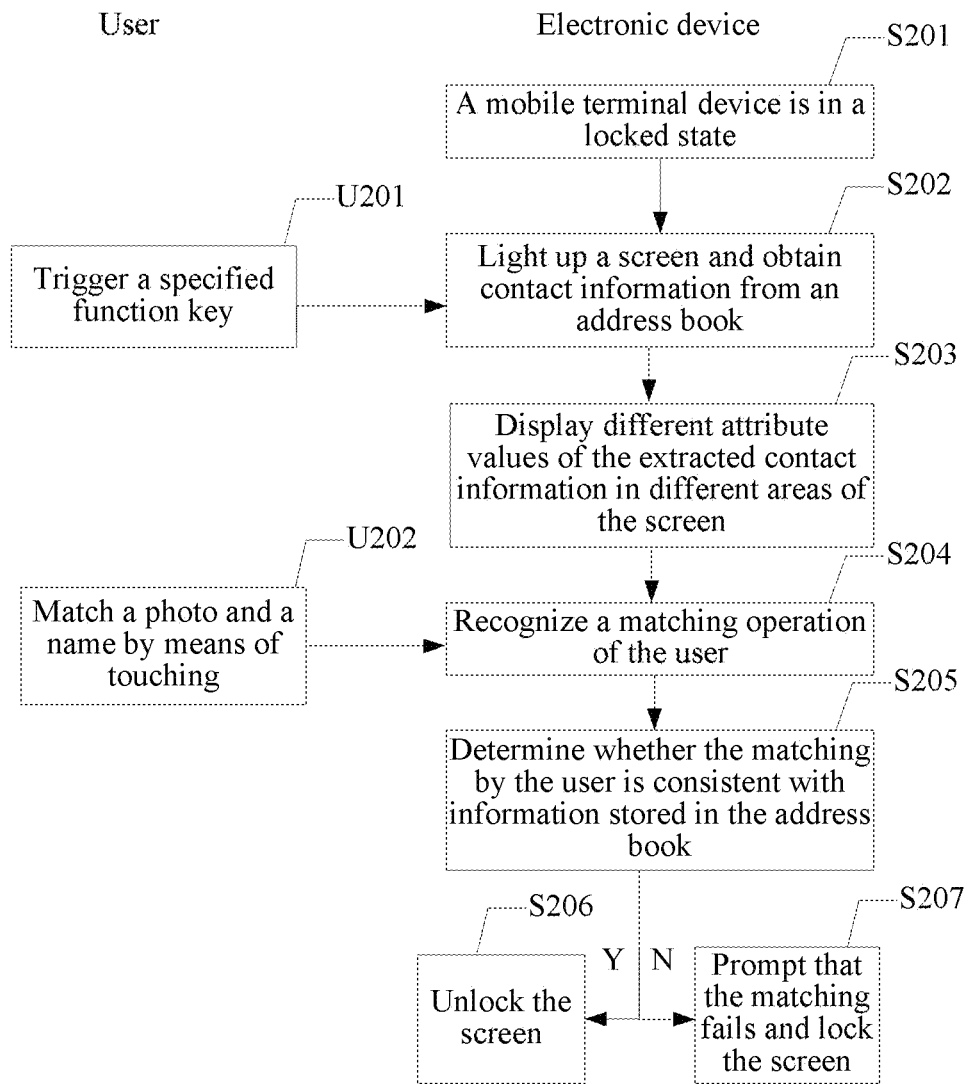
FIG. 2 is a flowchart of unlocking an electronic device according to some implementation manners of the present invention.

FIG. 2 is a flowchart of switching an electronic device 100 from a locked state to an unlocked state in some implementation manners of the present invention. At the beginning of unlocking, the electronic device 100 is in the locked state (step S201). When a user intends to unlock the electronic device 100, the user needs to trigger a specified function key on the electronic device 100 (step U201). The function key may be a single key such as an on-off button (not illustrated) of the electronic device 100, and only pressing the on-off button is required to implement the triggering. The function key may also be a combination of multiple function keys, such as a volume button and a camera shutter button (not illustrated). In this case, the triggering may be simultaneously pressing the volume button (a volume up button or a volume down button) and the camera shutter button.

The electronic device 100 detects the triggering from the user on the electronic device in step U201, and therefore determines that the user has the intent to unlock the electronic device 100. In this case, in step S202, the electronic device 100 lights up the screen 102. In addition, in some implementation manners of the present invention, an information invoking module 1124 extracts attribute information of some contacts of the user, such as contact names 1131, photos 1132, and contact manners 1133, from a storage unit 201, particularly an address book 113. The contact manner 1133 may be a phone number, an email address, an instant messaging number, or the like. In specific implementation and application, the information invoking module 1124 may extract the information in a random manner or in a manner predetermined by the user. For example, in some implementation manners of the present invention, the user may predetermine a contact group to be extracted and a specified contact manner, and the multiple pieces of contact information are extracted from the predetermined contact group. For example, the contact information may be predetermined to be extracted from a family group of the user, so that a family member of a nonuser has great difficulty in correctly unlocking the screen of the electronic device 100 of the user.

In step S203, the electronic device 100 displays, on different areas of the touchscreen 102, different attribute values of the contact information extracted by the information invoking module 1124 from the storage unit 201, particularly the address book 113, thereby forming, on the touchscreen 102, one or more visual prompts that can be used by the user to execute an operation of unlocking the electronic device 100. The visual prompt includes but is not limited to manners shown in FIG. 3A to FIG. 3D.

Figure 3A:
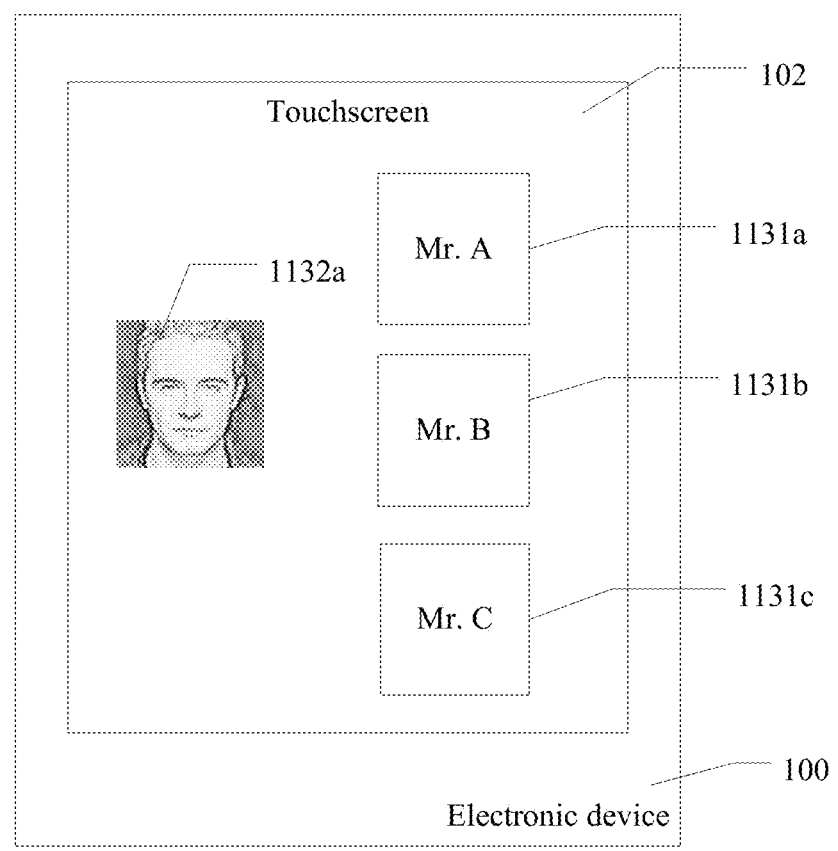
FIG. 3A to FIG. 3D are schematic diagrams of an unlocking interface according to some implementation manners of the present invention.
Figure 3B:
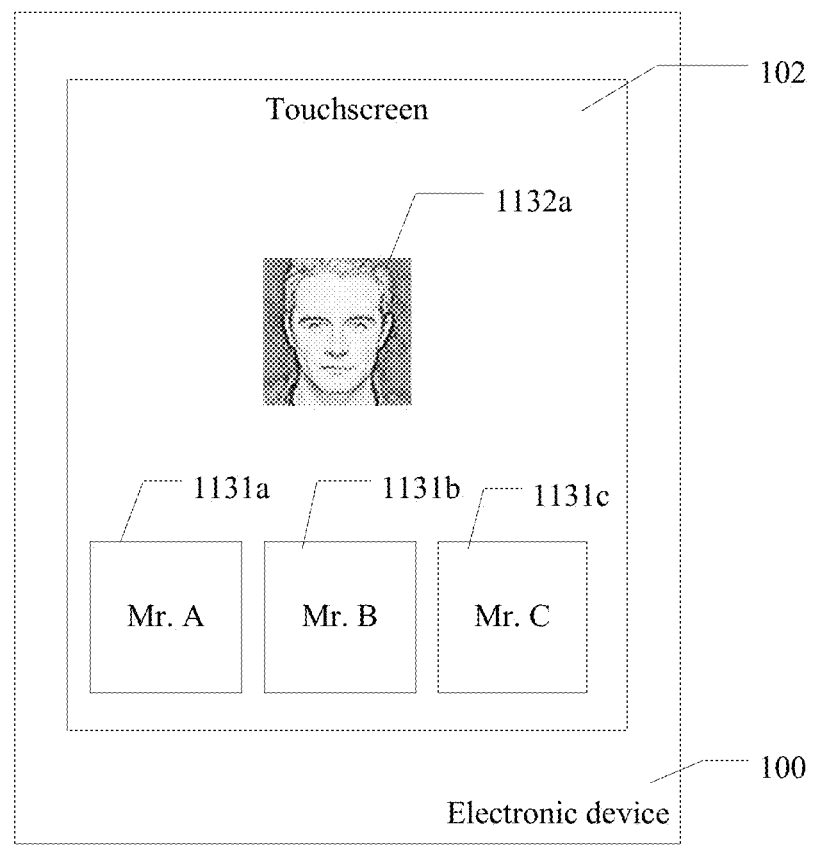
Figure 3C:
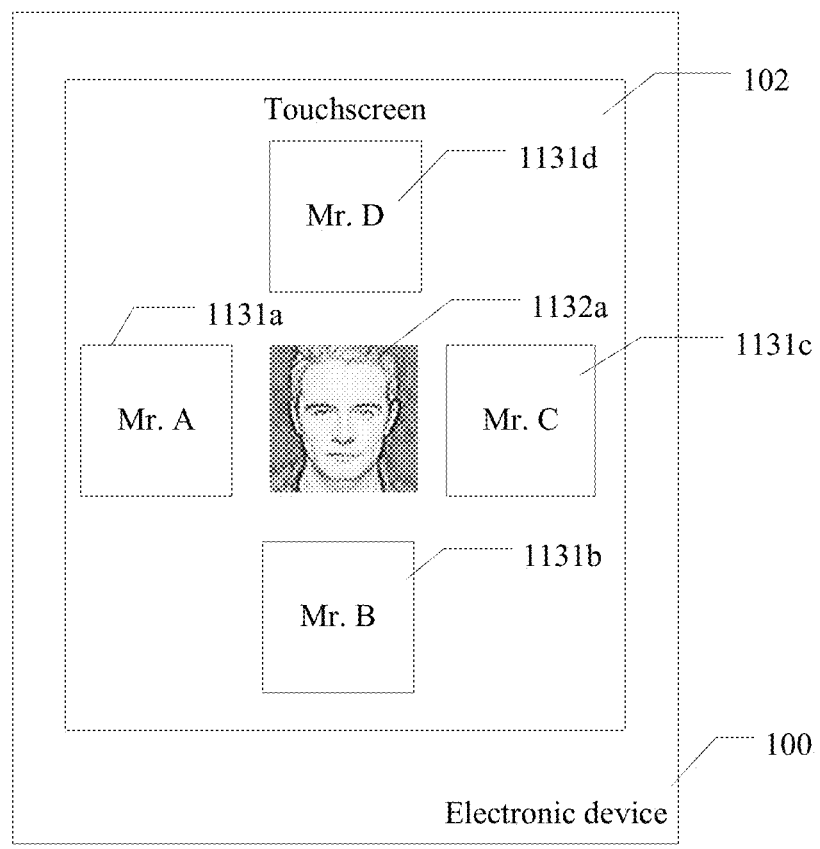

In FIG. 3A, the attribute values of the contact information extracted by the information invoking module 1124 from the storage unit 201, particularly the address book 113, include a photo and a name. In this implementation manner, the extracted contact photo and name are respectively referred to as a first attribute value and a second attribute value. In the implementation manner shown in FIG. 3A to FIG. 3D, the first attribute values and second attribute values are not quantitatively corresponding or symmetric, for example, in FIG. 3A, only one photo is displayed, but there are three names. In this implementation manner, the user needs to correctly match the contact person in the photo on the left and a contact name listed on the right before the electronic device 100 can unlock the screen 102. What is shown in FIG. 3B and FIG. 3C is similar to that shown in FIG. 3A, and a difference only lies in their specific arranging manners of photos and names. In FIG. 3B, the photo is in the upper part of the screen 102 and the multiple names are arranged below the photo. The photo in FIG. 3C is in the center of the screen and the multiple names are scattered around the photo. For ease of description, in description of the present invention, an area for displaying the first attribute value such as the photo on the screen 102 is referred to as a first area, and an area for displaying the second attribute value such as the name on the screen 102 is referred to as a second area. For example, the first area of the screen 102 in FIG. 3A is the left side shown in the figure, and the second area is the right side shown in the figure; and the first area in FIG. 3C is the central area of the screen 102 shown in the figure, and the second area is the peripheral area of the screen 102.

In another implementation manner of the present invention, in order to increase complexity of screen unlocking, there may be respectively multiple photos and multiple names. For example, the number of photos shown in FIG. 3A to FIG. 3C may each be three, respectively corresponding to names. The user needs to match all the photos and names before unlocking the screen 102. For example, in a case shown in FIG. 3A and FIG. 3B, a probability that the user correctly unlocks the screen is one thirds, and when the number of displayed photos increases from one to three, a probability of completely and correctly unlocking the screen decreases to one sixths.

Figure 3D:
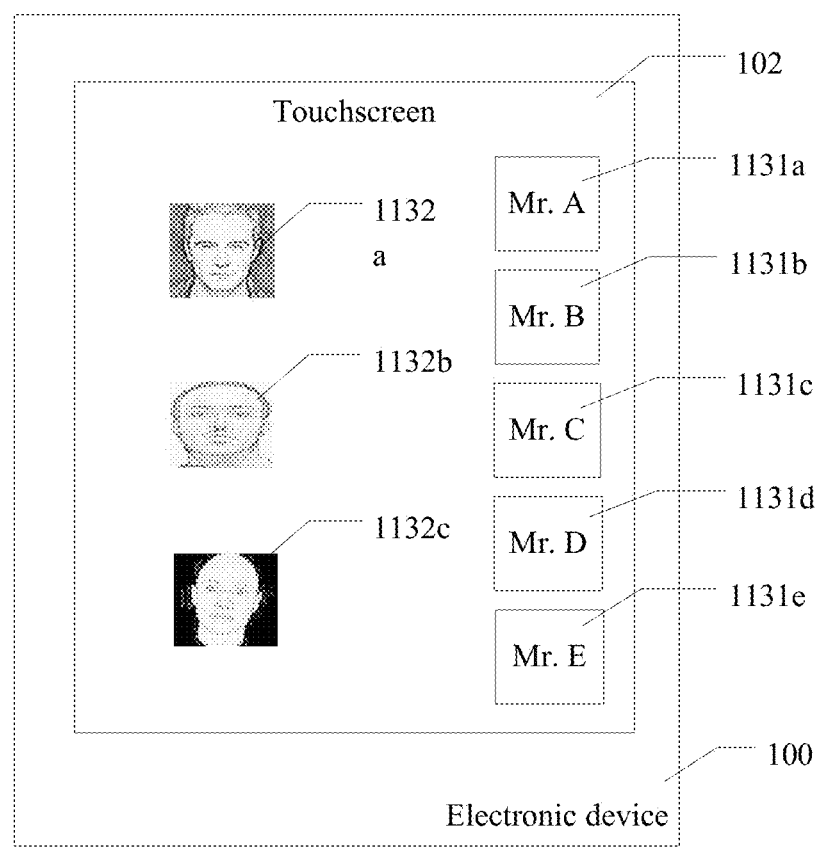

In some other implementation manners, in order to further increase the complexity of screen unlocking, there are not only respectively multiple photos and multiple names, but also the photos and the names are not quantitatively corresponding or symmetric, as shown in FIG. 3D. The number of photos shown in FIG. 3D is three, and the number of names is five. According to probability-based calculation, the probability that the user completely and correctly unlocks the screen is 1/60, thereby significantly increasing difficulty in correctly unlocking the screen. A nonuser of the electronic device 100 will have great difficulty to unlock the screen correctly. Although the present invention is not meant to increase the difficulty of screen unlocking, a change in the unlocking probability caused by the specific implementation manners of the present invention eloquently demonstrates that the interface design in this manner may accordingly increase security of information in the electronic device 100.

In the implementation manner of FIG. 3A to FIG. 3D, photo is used as the first attribute value of contact information and name as the second attribute value. In another implementation manner, name may also be used as the first attribute value of contact information and photo as the second attribute value. In some other implementation manners, contact manner may also be used as the first attribute value, and photo or name as the second attribute value. Alternatively, photo or name is used as the first attribute value and relationship with the user as the second attribute value, and the like, which is not limited. A spiritual essence of the present invention is to make use of familiarity of the user of the electronic device 100 with information stored in the storage unit 201, particularly in the frequently used address book 113, in order to increase difficulty in unlocking the electronic device 100 for an unauthorized user, thereby improving security of the electronic device 100. Other unlocking interfaces and manners implemented by using the information stored in the storage unit 201 shall all fall within the protection scope of the present invention. In another implementation manner, as long as the storage unit 201 stores first data and second data that have a mapping relationship (similar to the foregoing first attribute value and second attribute value), for example, a household expenditure item such as water and electricity fees, phone charges, or gas costs and its corresponding payment bank, the first data and the second data may be extracted and used as source data of an unlocking manner. There are multiple specific implementation manners, which are not listed here one by one.

In some implementation manners of the present invention, first attribute values and second attribute values of the contact information are displayed as icons on the screen 102. For example, in FIG. 3A, after being extracted from the address book 113, the photo 1132 in the contact information is displayed as a photo icon 1132*a* on the screen. Similarly, the names 1131 are displayed as name icons 1131*a*, 1131*b*, and 1131*c*. The manners shown in FIG. 3B to FIG. 3D are similar to that in FIG. 3A, and details are not described herein again. In some other implementation manners, the names 1131 may also be displayed as boxes, that is, name boxes 1131*a*, 1131*b*, and 1131*c*, so as to enhance use experience of the user.

Figure 3E:
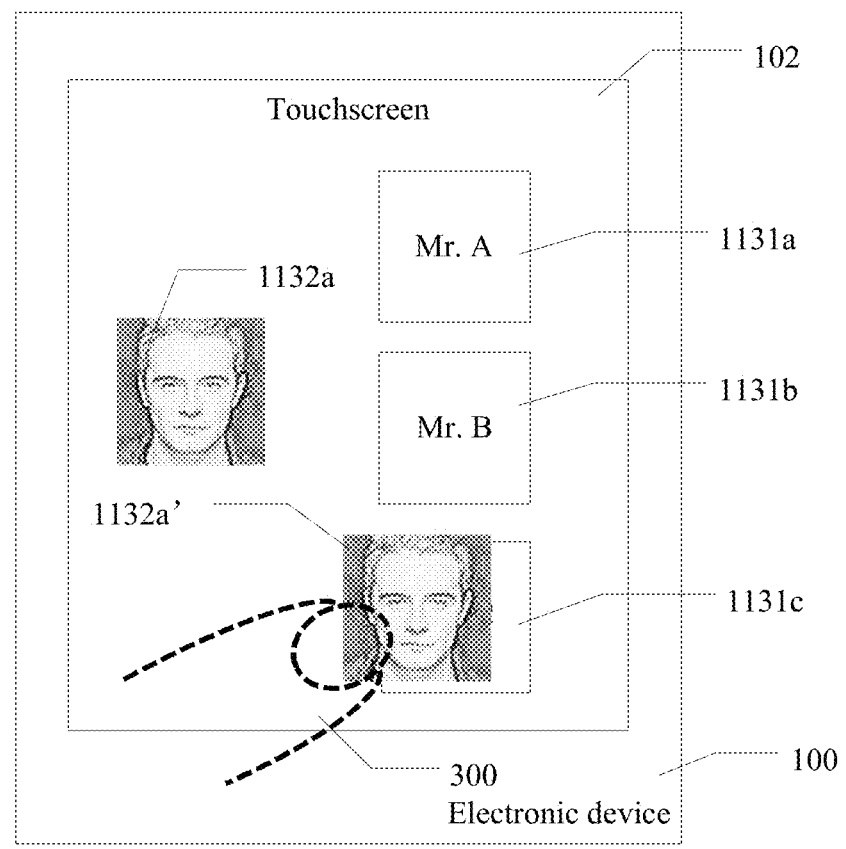
FIG. 3E to FIG. 3F are schematic diagrams of an unlocking process according to some implementation manners of the present invention.

After these different attribute values of the contact information are displayed in a visual manner on the screen 102, in step U202, the user may perform an operation on the displayed content, that is, match a photo (icon) and a name (icon) by means of touching in this implementation manner. For example, the user may use a finger 300 to "touch and hold" the photo icon 1132*a*, and then move the finger 300 to the name icon 1131*a*, 1131*b*, or 1131*c* that is corresponding to a correct name confirmed by the user, and release the finger 300, as shown in FIG. 3E. During a process of moving the finger 300, another photo icon 1132*a*' is generated and moves along with the change of an area touched by the finger 300. In this implementation manner of the present invention, when the another photo icon 1132*a*' partly covers the icon of the second attribute value, that is, the name icon 1131*a*, 1131*b* or 1131*c* in this example, the action recognizing module 1121 recognizes the matching operation of the user (step S204). Meanwhile, the determining module 1122 determines whether a correspondence between the photo icon 1132*a* that is moved by the user and the partly covered name icon 1131*a*, 1131*b*, or 1131*c* is consistent with a correspondence stored in the address book 113 (step S205). If a consistency is determined, the determining module 1122 determines that the matching by the user is correct; and otherwise, the determining module 1122 determines that the matching by the user is incorrect.

If the matching is correct, the icons of the first attribute value and the second attribute value, that is, the another photo icon 1132*a*' and the corresponding name icon 1131*a*, 1131*b* or 1131*c*, automatically coincide, and at the same time, the touchscreen 102 is unlocked (step S206). If the matching is incorrect, the icon 1132*a*' of the first attribute value automatically moves to its original position or disappears, and the touchscreen 102 is kept in the locked state (step S207). In some other implementation manners of the present invention, if the matching is incorrect, the icon 1132*a*' of the first attribute value may also automatically coincide with the name icon 1131*a*, 1131*b*, or 1131*c* to which the icon 1132*a*' "slides", but the touchscreen 102 is still kept in the locked state. In this implementation manner of the present invention, that the screen 102 is unlocked or kept in the locked state is processed by the executing module 1123.

Unlocking manners of the unlocking interface shown in FIG. 3B to FIG. 3C are the same as that in FIG. 3A, and details are not described herein again. In an implementation manner corresponding to the unlocking of the multiple photos and multiple names shown in FIG. 3D, after the finger 300 "chooses" a photo icon 1132*a*, 1132*b*, or 1132*c* by means of pressing and moves the photo icon to a name icon designated by the user, the chosen photo stays on the corresponding name icon or name box 1131*a*, 1131*b*, 1131*c*, 1131*d* or 1131*e*, that is, coincides with the corresponding name icon or name box 1131*a*, 1131*b*, 1131*c*, 1131*d*, or 1131*e*, until the user matches all the photos and names. If all matches are correct, the touchscreen 102 is unlocked; if at least one photo is not correctly matched with a corresponding name, the touchscreen 102 is kept in the locked state. In this manner, a probability that the user correctly unlocks the screen 102 is $\frac{1}{60}$.

Figure 3F:
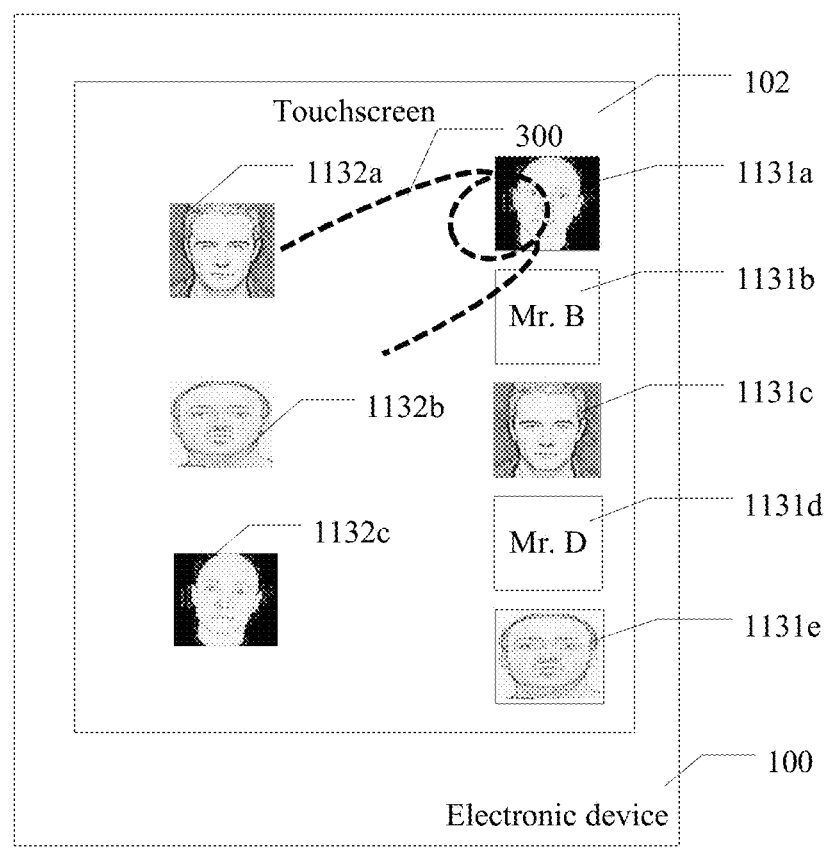

In some other implementation manners, when a photo icon 1132*a*, 1132*b* or 1132*c* does not match a corresponding name icon or name box 1131*a*, 1131*b*, 1131*c*, 1131*d*, or 1131*e*, a derived photo icon 1132*a*', 1132*b*', or 1132*c*' "bounces" back to an original position of the photo icon 1132*a*, 1132*b* or 1132*c*; if the matching is correct, the photo icon coincides with the corresponding name icon. However, in this manner, the unlocking probability increases because the unlocking difficulty for the user decreases by means of "trial matching", that is, when the user does not know a correct correspondence between a photo and a name, the user performs pairing in a manner of matching photos and names one by one, and eventually unlocks the screen 102. In an example shown in FIG. 3F, the probability of completely unlocking the screen by means of "trial matching" is $\frac{1}{11}$, which greatly rises compared with the foregoing $\frac{1}{60}$.

In this implementation manner of the present invention, when the electronic device 100 is in the locked state, the electronic device does not respond to any touch, on the screen, that is not corresponding to an action of matching contact attribute values.

Figure 4:
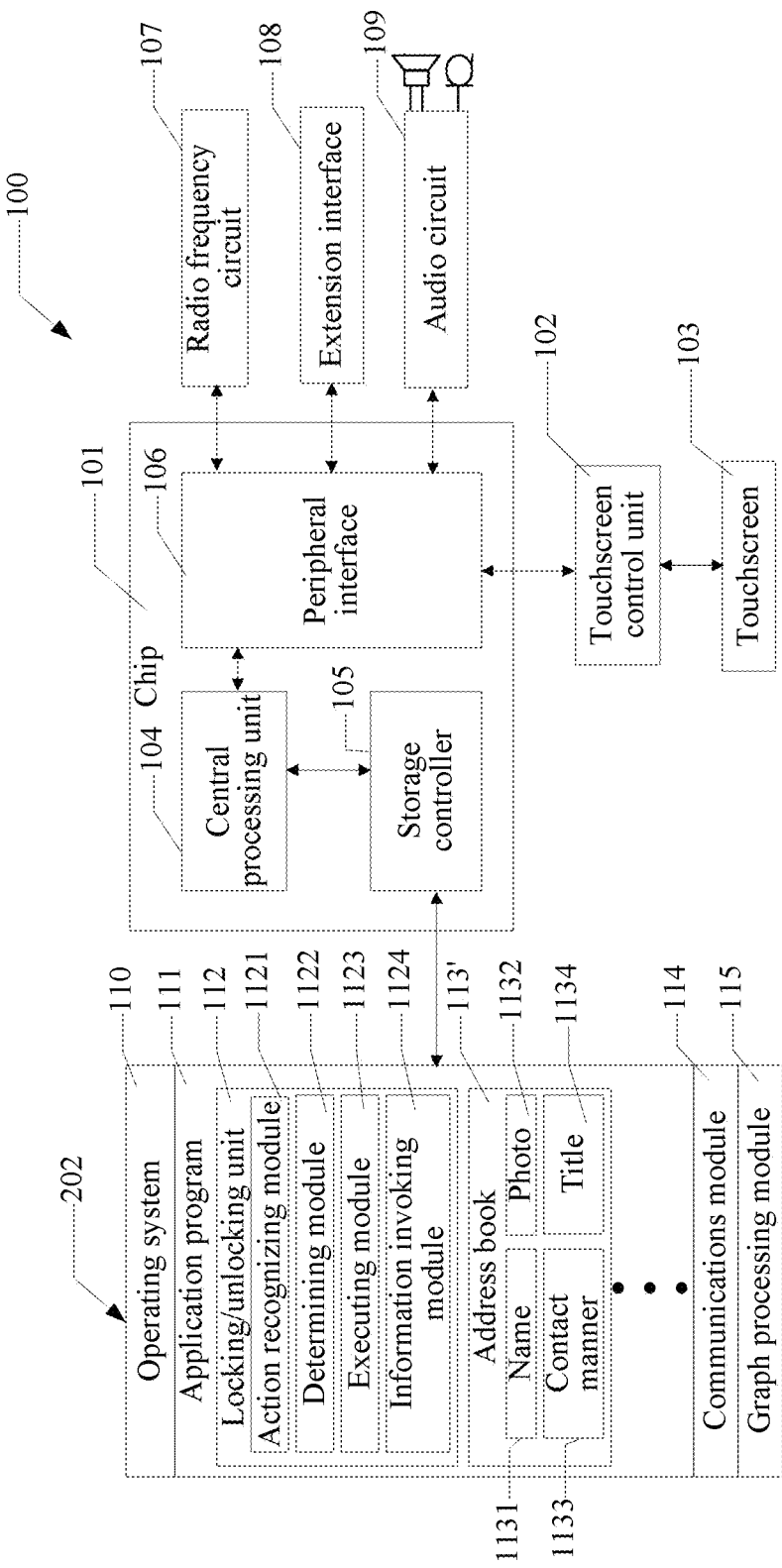
FIG. 4 is a schematic diagram of a system architecture of an electronic device according to some other implementation manners of the present invention.

FIG. 4 is a systematic block diagram of an electronic device 100 according to another implementation manner of the present invention. In this implementation manner, components of the electronic device 100, such as a touchscreen 102, a touchscreen control unit 103, a central processing unit 104, a storage controller 105, a peripheral interface 106, a radio frequency circuit 107, an extension interface 108, and an audio circuit 109 are the same as those shown in FIG. 1, and details are not described in the following description.

In this implementation manner, a storage unit 201 of the electronic device 100 stores software components or instruction sets that implement functions of the electronic device 100. The software components or instruction sets include but are not limited to an operating system 110, various types of application program 111, a screen locking/unlocking unit 112, and an address book 113' that are shown in FIG. 4. The operating system 110 and various types of application program 111 shown in FIG. 4 are the same as those shown in FIG. 1, and details are also not described herein again.

The screen locking/unlocking unit 112 shown in FIG. 4 includes an action recognizing module 1121, a determining module 1122, an executing module 1123, and an information invoking module 1124. The address book 113' stores a name 1131, a photo 1132, a contact manner 1133 that are of a contact of the user, and a title 1134 by which the user addresses each contact. The following describes this specific implementation manner with reference to embodiments shown in FIG. 5 to FIG. 8. In some implementation manners, the title 1134 may also be the name 1131, which is subject to a setting of the user for the electronic device 100 in specific implementation. When the title 1134 is the name 1131, the electronic device shown in FIG. 4 is the same as that in FIG. 1.

Figure 5:
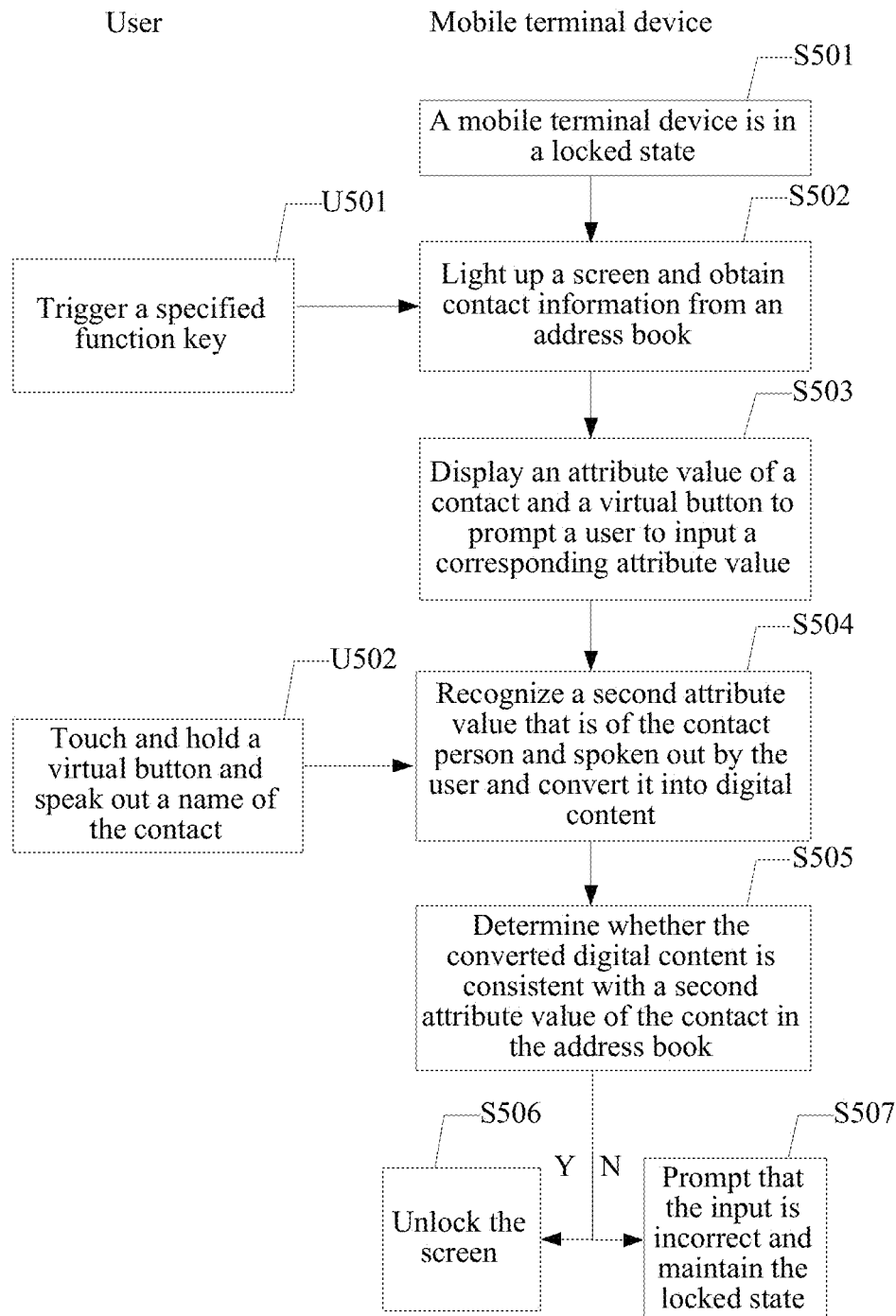
FIG. 5 is a flowchart of unlocking an electronic device according to some other implementation manners of the present invention.

FIG. 5 is a flowchart of switching an electronic device 100 from a locked state to an unlocked state according to some other implementation manners of the present invention. At the beginning of unlocking, the electronic device 100 is in the locked state (step S501). When a user intends to unlock the electronic device 100, the user needs to trigger a specified function key on the electronic device 100 (step U501). The function key may be a single key such as an on-off button (not illustrated) of the electronic device 100, and only pressing the on-off button is required to implement the triggering. The function key may also be a combination of multiple function keys, such as a volume button and a camera shutter button (not illustrated). In this case, the triggering may be simultaneously pressing the volume button (a volume up button or a volume down button) and the camera shutter button.

The electronic device 100 detects the triggering from the user on the electronic device in step U501, and therefore determines that the user has the intent to unlock the electronic device 100. In this case, in step S502, the electronic device 100 lights up the screen 102. In addition, in some implementation manners of the present invention, an information invoking module 1124 extracts attribute information of some contacts of the user, such as contact names 1131, photos 1132, contact manners 1133 and/or titles 1134 by which the user addresses the contacts, from a storage unit 202, particularly an address book 113'. The contact manner 1133 may be a phone number, an email address, an instant messaging number, or the like. In specific implementation and application, the information invoking module 1124 may extract the information in a random manner or in a manner predetermined by the user. For example, in some implementation manners of the present invention, the user may predetermine a contact group to be extracted and a specified contact manner, and the multiple pieces of contact information are extracted from the predetermined contact group. For example, the contact information may be predetermined to be extracted from a family group of the user or from a group of close friends, which depends on content that is set by the user in the electronic device 100, and is not limited.

In step S503, the electronic device 100 displays, on the touchscreen 102, one of the attribute values of the contact information extracted by the information invoking module 1124 from the storage unit 202, particularly the address book 113', and at the same time displays a virtual button on another area of the touchscreen 102, and prompts the user to input another attribute value corresponding to the displayed attribute value. In this way, a visual prompt that can be used by the user to execute an operation of unlocking the electronic device 100 is formed on the touchscreen 102. For example, the visual prompt may include but is not limited to manners shown in FIG. 6A to FIG. 6B.

Figure 6A:
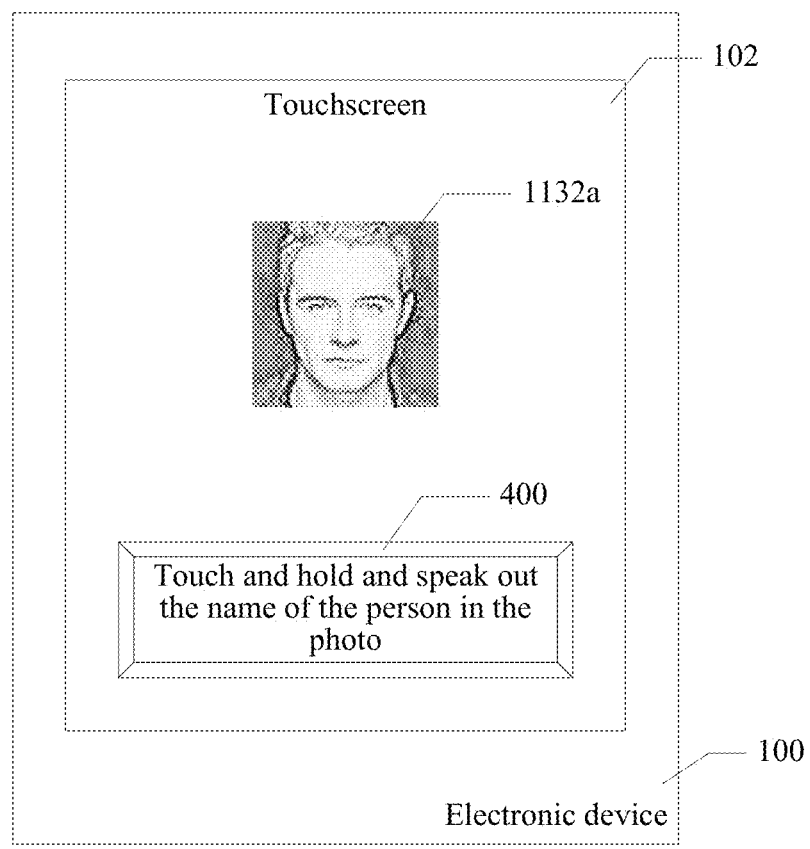
FIG. 6A to FIG. 6B are schematic diagrams of an unlocking interface according to some other implementation manners of the present invention.
Figure 6B:
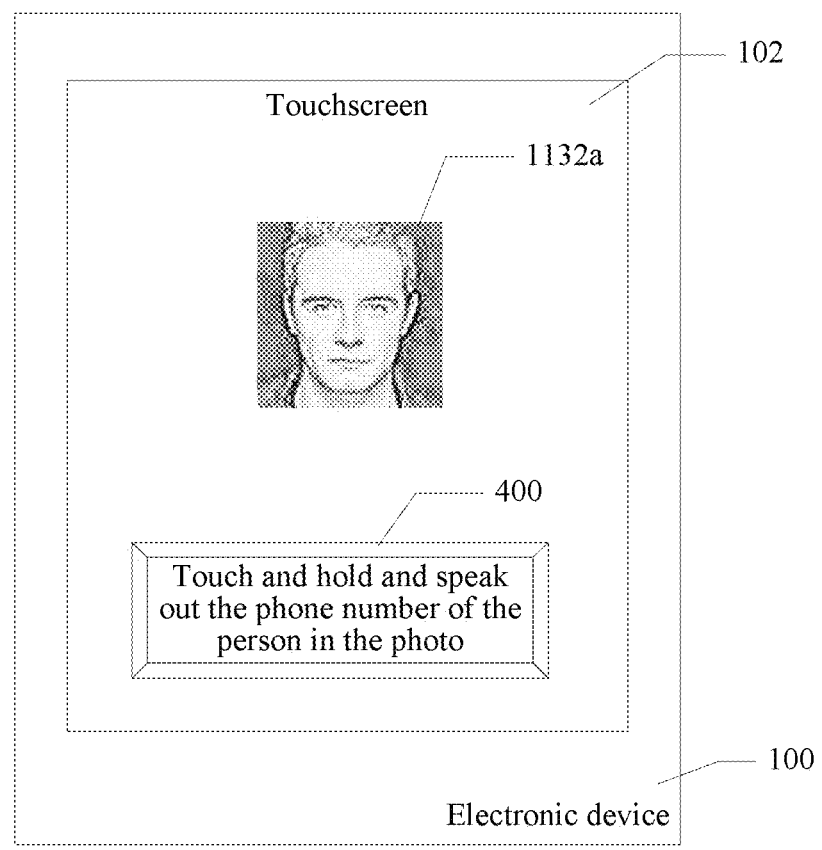

For example, in FIG. 6A, the attribute value of the contact information extracted by the information invoking module 1124 from the storage unit 202, particularly the address book 113', includes a photo 1132 and a name 1131. In this implementation manner, the extracted contact photo 1132 and name 1131 are respectively referred to as the first attribute value and the second attribute value. In this example, the first attribute value, that is, the photo 1132, is displayed as a photo icon 1132a on the screen 102. A virtual button 400 is displayed in another area of the screen 102, and content prompting user input is displayed on the virtual button 400, for example, content displayed in FIG. 6A is "Touch and hold and speak out the name of the person in the photo". In some other implementation manners, the displayed and prompted content changes according to the content that is extracted by the information invoking module 1124 from the storage unit 202. For example, if the attribute value of the contact information extracted by the information invoking module 1124 from the address book 113' of the storage unit 201 is the photo 1132 and the contact manner 1133, the content prompting user input, which is displayed on the virtual button 400, is "Touch and hold and speak out the phone number of the person in the photo", as shown in FIG. 6B.

After the content prompting user input is displayed on the screen 102, in step U502, the user may touch and hold, according to the prompt, the screen area in which the virtual button 400 is located, and speak out, against a microphone 1092, the attribute value of a contact required in the prompt, such as the name or phone number of the contact. In step S504, the action recognizing module 1121 recognizes a voice that is input by the user and converts the voice that is input by the user into machine-recognizable digital content. That is, the determining module is further configured to convert the voice that is input by the user into a same file format as the second attribute value in the storage unit. For example, the action recognizing module 1121 may include an A/D conversion module to convert the voice content into the digital content. In step S505, the determining module 1122 determines whether the digital content that is recognized and converted by the action recognizing module 1121 is the same as the corresponding second attribute value, for example, a name or phone number, of the contact in the address book 113'. If the determining module 1122 determines that the digital content is the same as the corresponding second attribute value of the contact in the address book 113', in step S506, the executing module 1123 unlocks the screen 102; and otherwise, in step S507, the executing module prompts that the user input is incorrect and keeps the electronic device 100 in the locked state.

Figure 7:
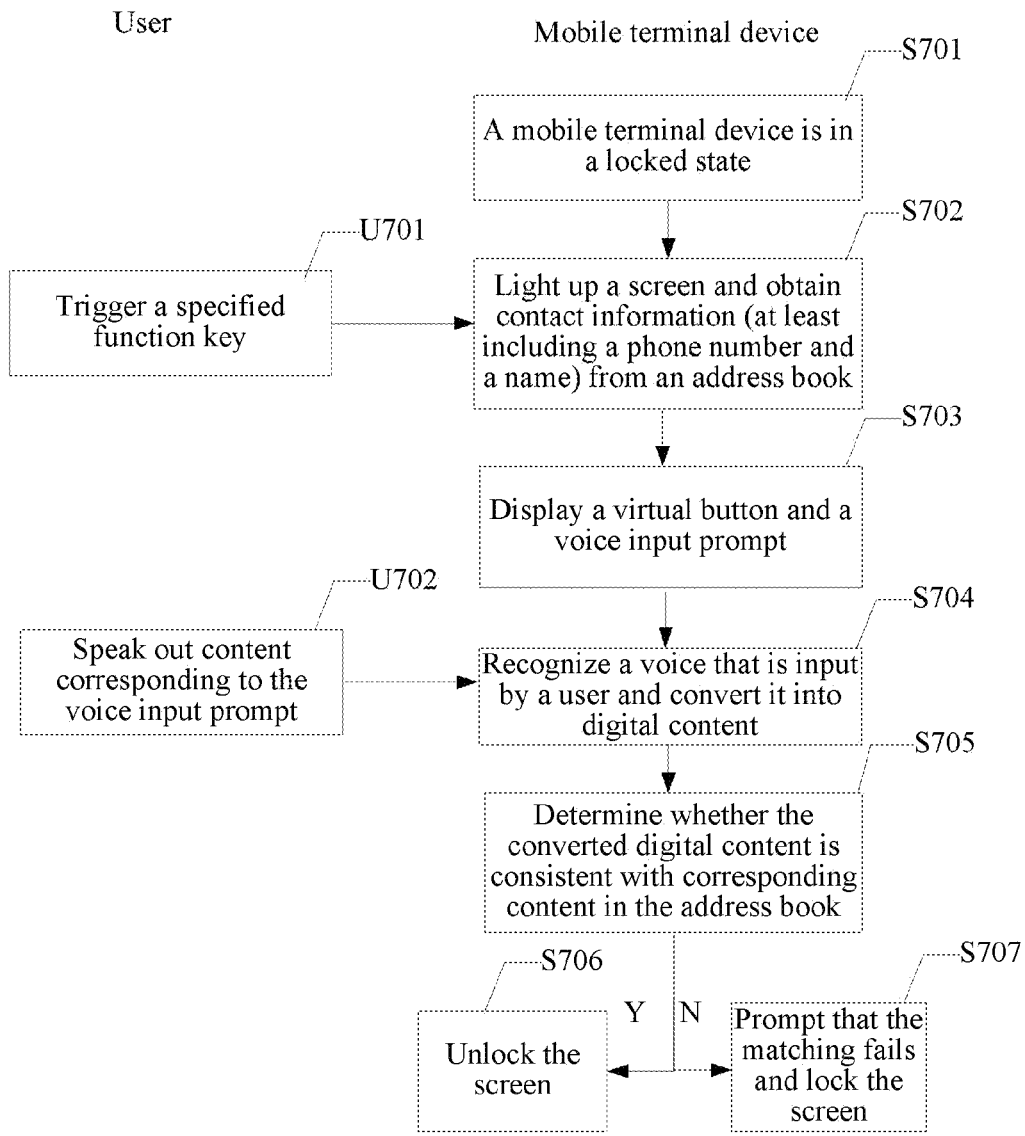
FIG. 7 is a flowchart of unlocking an electronic device according to still another implementation manner of the present invention.

In some other implementation manners of the present invention, a prompt for user input may also be directly given according to an attribute value of contact information. An implementation process of one example is shown in FIG. 7 and a visual prompt for user input is shown in FIG. 8. FIG. 7 is a flowchart of switching an electronic device 100 of the present invention from a locked state to an unlocked state. At the beginning of unlocking, the electronic device 100 is in the locked state (step S701). When a user intends to unlock the electronic device 100, the user needs to trigger a specified function key on the electronic device 100 (step U701). The function key may be a single key such as an on-off button (not illustrated) of the electronic device 100, and only pressing the on-off button is required to implement the triggering. The function key may also be a combination of multiple function keys, such as a volume button and a camera shutter button (not illustrated). In this case, the triggering may be simultaneously pressing the volume button (a volume up button or a volume down button) and the camera shutter button.

The electronic device 100 detects the triggering from the user on the electronic device in step U701, and therefore determines that the user has the intent to unlock the electronic device 100. In this case, in step S702, the electronic device 100 lights up the screen 102. In addition, an information invoking module 1124 extracts attribute information of some contacts of the user, such as contact names 1131, photos 1132, and contact manners 1133, from a storage unit 202, particularly an address book 113'. The contact manner 1133 may be a mobile phone number, a home phone number, an email address, an instant messaging number, or the like. In specific implementation and application, the information invoking module 1124 may extract the information in a random manner or in a manner predetermined by the user.

For example, in some implementation manners of the present invention, the user may predetermine a contact group to be extracted and a specified contact manner, and the multiple pieces of contact information are extracted from the predetermined contact group. For example, the contact information may be predetermined to be extracted from a family group of the user or from a group of close friends, which depends on content that is set by the user in the electronic device 100, and is not limited. In the following description, an example in which the content invoked by the information invoking module 1124 is information about the owner is used for description, and then the first attribute value of the contact information is a name of the owner, and the second attribute value is a home phone number of the owner.

In step S703, the electronic device 100 displays a microphone symbol on the touchscreen 102, so as to prompt the user that a voice input is required, and at the same time displays a virtual button in another area different from an area in which the microphone symbol is displayed on the touchscreen 102, and prompts the user to input an attribute value of the contact information. In this way, a visual prompt that can be used by the user to execute an operation of unlocking the electronic device 100 is formed on the touchscreen 102. For example, a visual prompt shown in FIG. 8A includes a microphone symbol 1132*d* and a virtual button 400. Content prompting user input is embedded into the virtual button 400, and is "Touch and hold and speak out the home phone number of the owner" in this example. In another implementation manner of the present invention, the microphone symbol 1132*d* may also be not displayed, and only a virtual button 400 and content prompting user input are displayed on the screen 102, as shown in FIG. 8B.

Figure 8A:
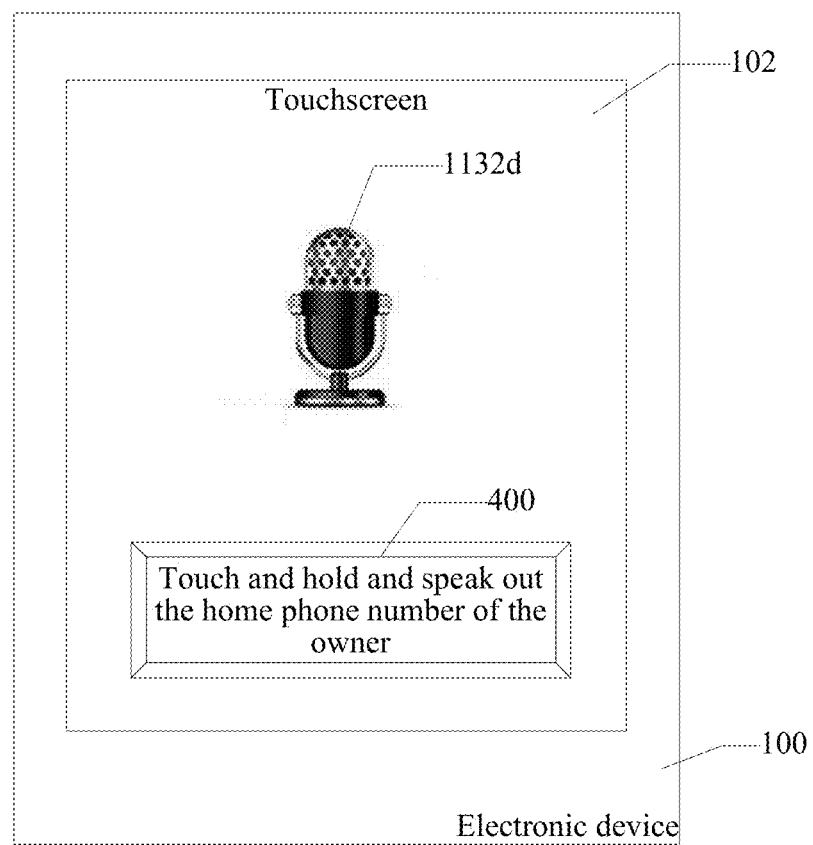
FIG. 8A to FIG. 8B are schematic diagrams of an unlocking interface according to still another implementation manner of the present invention.
Figure 8B:
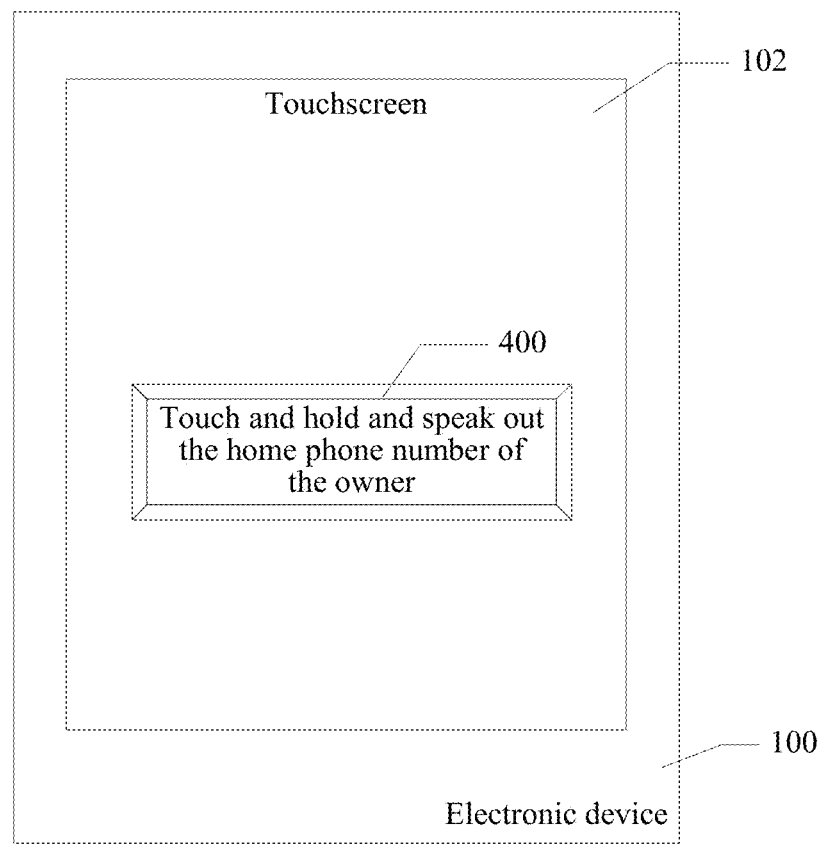

After the visual prompt for user input is displayed on the screen 102, in step U702, the user may touch and hold, according to the prompt, the screen area in which the virtual button 400 is located, and speak out, against the microphone 1092, corresponding content required in the voice input prompt, such as the phone number of the owner shown in FIG. 8A. In step S704, the action recognizing module 1121 recognizes a voice that is input by the user and converts the voice that is input by the user into machine-recognizable digital content. For example, the action recognizing module 1121 may include an A/D conversion module to convert the voice content into the digital content. In step S705, the determining module 1122 determines whether the digital content that is recognized and converted by the action recognizing module 1121 is the same as a corresponding second attribute value, such as the home phone number of the owner, of a contact in the address book 113'. If the determining module 1122 determines that the digital content is the same as the corresponding second attribute value of the contact, that is, the home phone number of the owner, in the address book 113', in step S706, the executing module 1123 unlocks the screen 102; and otherwise, in step S707, the executing module prompts that the user input is incorrect and keeps the electronic device 100 in the locked state.

Figure 9A:
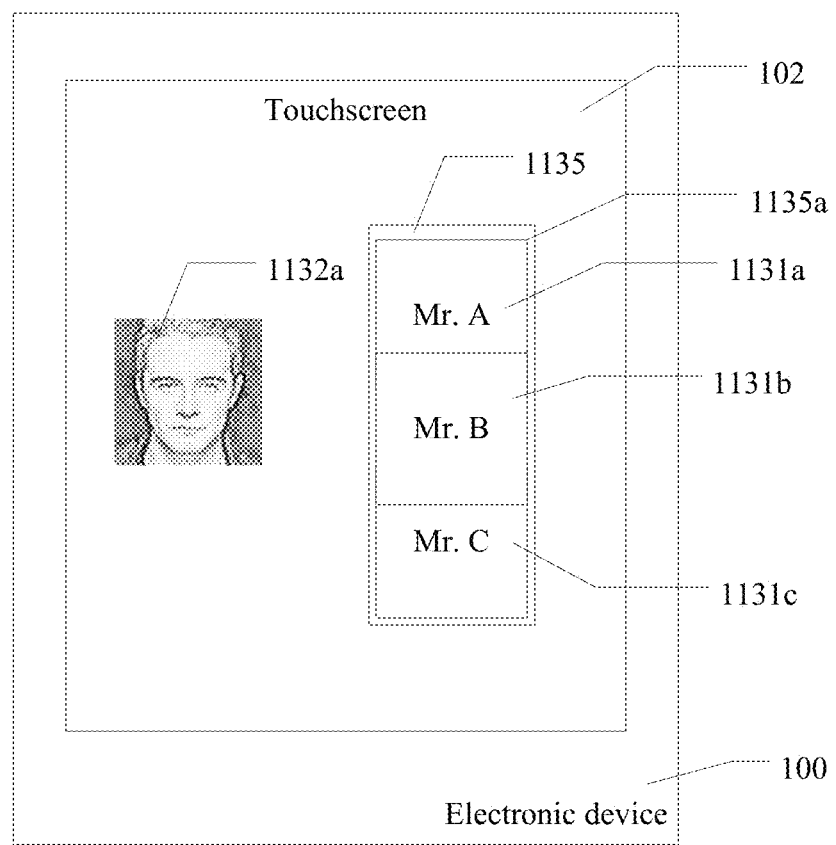
FIG. 9A to FIG. 9C are schematic diagrams of a rolling wheel unlocking interface according to an implementation manner of the present invention.

The visual prompt for user input in some other implementation manners of the present invention is shown in FIG. 9A. A screen unlocking solution in this implementation manner can be applied to the electronic device 100 shown in FIG. 1 or FIG. 4, where software and hardware modules involved are the same as those shown in FIG. 1 or FIG. 4 and details are not described herein again. In the implementation manner shown in FIG. 9A, after it is detected that the user intends to unlock the screen, the information invoking module 1124 extracts the contact information from the address book 113. In some other implementation manners, the contact information is extracted from a predetermined contact group. The first attribute value, such as a photo 1132, of the extracted contact information is displayed as a photo icon 1132*a* in a first area of the screen 102 on the screen. A difference from the foregoing solutions is that in this implementation manner, the second attribute values of the extracted contact information are displayed on the screen in a selectable manner. As shown in FIG. 9A, on the screen 102, a rolling wheel area 1135 is displayed in another area that is different from the first area, and a rolling wheel 1135*a* is displayed in the rolling wheel area 1135. The second attribute values, such as names 1131, of the contact information are associated with the rolling wheel 1135*a*. After the rolling wheel 1135*a* is touched by the user in a moving manner, a "rolling" manner runs in response, and as the rolling wheel 1135*a* "rolls", the names 1131 are sequentially displayed at the center of the rolling wheel area 1135. When a second attribute value that is to be chosen by the user is displayed at the center of the rolling wheel area 1135, the user may tap the to-be-chosen second attribute value. The action recognizing module 1121 can recognize an action of the user performing an operation on the rolling wheel 1135*a* and tapping the to-be-chosen second attribute value. The determining module 1122 determines whether the second attribute value chosen by the user by means of tapping is consistent with a second attribute value that is in the storage unit and corresponding to the displayed first attribute value. If a consistency is determined, the determining module 1122 determines that the input of the user is correct, and meanwhile, the executing module 1123 unlocks the screen; and otherwise, it is determined that the input of the user is incorrect, and the electronic device 100 is kept in a screen-locked state.

In this implementation manner of the present invention, that the second attribute values (such as names 1131) are associated with the rolling wheel 1135*a* includes the following: when the user touches and slides the rolling wheel 1135*a*, name icons 1131*a*, 1131*b*, and 1131*c* that represent the names 1131 are sequentially displayed, presenting a "rolling" effect. In other words, multiple name icons, such as 1131*a*, 1131*b*, and 1131*c*, together form the rolling wheel 1135*a*.

Figure 9B:
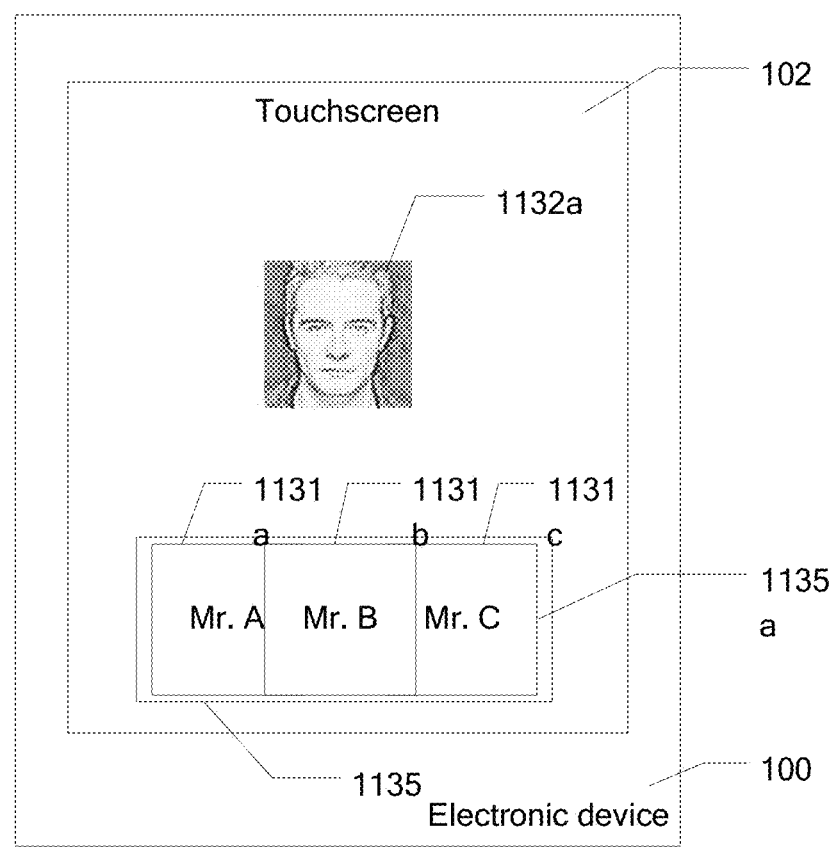

FIG. 9B shows another manner of FIG. 9A and is the same as FIG. 9A in essence. The only difference lies in that a rolling direction of the rolling wheel 1135*a* is changed from vertical, as shown in FIG. 9A, to horizontal, and except for this, FIG. 9B is consistent with FIG. 9A; therefore, details are not described again in this specification.

Figure 9C:
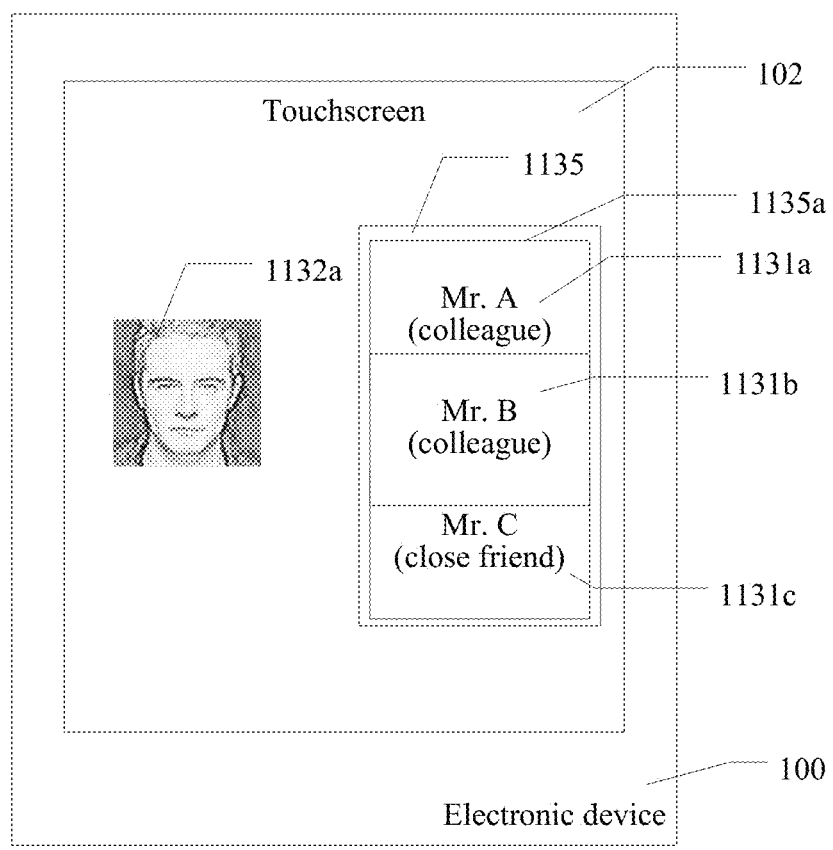

An implementation manner shown in FIG. 9C is similar to that in FIG. 9A, and a difference lies in that a third attribute value of a contact is additionally displayed, for example, in FIG. 9C, two attribute values, a contact name and a relationship with the user, are displayed on the rolling wheel 1135*a* at the same time. In a specific implementation manner, only one group of contact name and relationship with the user is consistent with a match in the address book. The user can unlock the screen 102 only by choosing a combination in which the two attribute values are correctly matched. Such implementation manner undoubtedly increases unlocking difficulty, thereby improving security of information in the electronic device 100.

Figure 10:
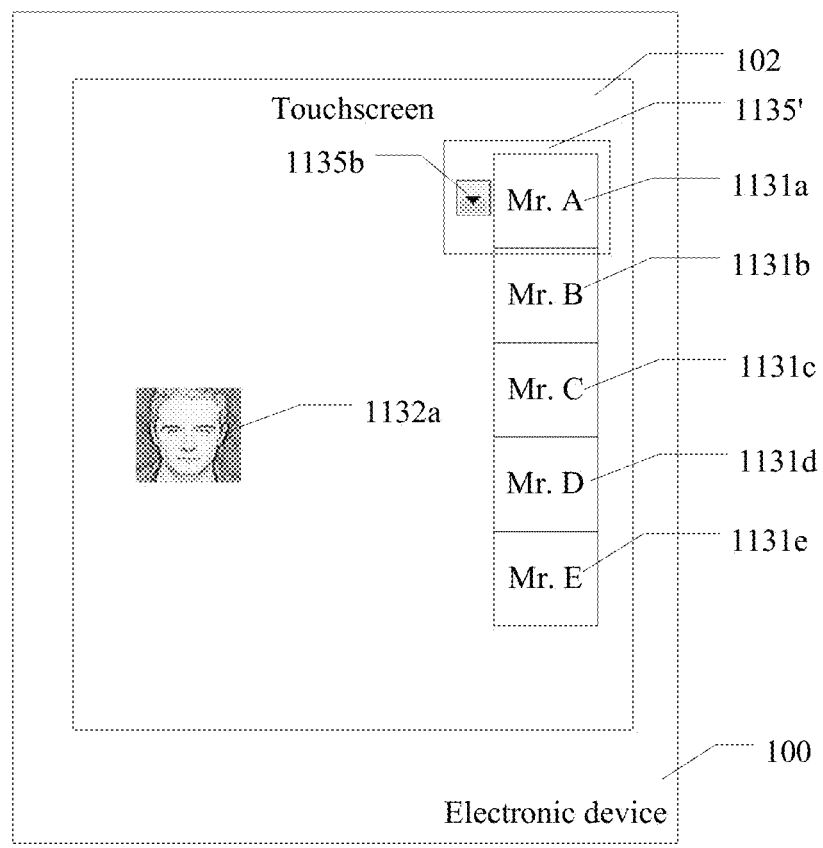
FIG. 10 is a schematic diagram of a drop down menu unlocking interface according to an implementation manner of the present invention.

FIG. 10 shows still another implementation manner of unlocking a screen according to the present invention. A screen unlocking solution in this implementation manner can be applied to the electronic device 100 shown in FIG. 1 or FIG. 4, where software and hardware modules involved are the same as those shown in FIG. 1 or FIG. 4 and details are not described herein again. In the implementation manner shown in FIG. 10, after it is detected that the user intends to unlock the screen, the information invoking module 1124 extracts the contact information from the address book 113. The first attribute value, such as a photo 1132, of the contact information is displayed as the photo icon 1132a in the first area of the screen 102 on the screen. A difference from the foregoing solutions is that in this implementation manner, the second attribute values of the extracted contact information converge in a drop down menu (Drop Down Menu) 1135', that is, in this implementation manner, the selectable manner for the user is a drop down menu manner. After the user taps an sigh 1135b of the drop down menu 1135', the second attribute values of the extracted contact information, such as name icons 1131a, 1131b, and 1131c of the name 1131 of the contact, are presented in a drop down manner. In this case, the user can tap the to-be-chosen second attribute value. In a specific implementation manner of the present invention, the sigh 1135b of the drop down menu may be an illustrated arrow symbol, and it may also be that there is no arrow symbol, but only one icon such as the icon 1131a of the second attribute value is displayed. When the user taps the icon 1131a, other icons 1131b-1131e are presented immediately in a drop down menu manner.

In a process in which the user taps the drop down menu and chooses an icon corresponding to a second attribute value, the action recognizing module 1121 can recognize the foregoing operation action of the user. After that, the determining module 1122 determines whether the second attribute value chosen by the user by means of tapping is consistent with a second attribute value that is in the storage unit and corresponding to the displayed first attribute value. If a consistency is determined, the determining module 1122 determines that the input of the user is correct, and meanwhile, the executing module 1123 unlocks the screen; and otherwise, it is determined that the input of the user is incorrect, and the electronic device 100 is kept in a screen-locked state.

Some exemplary specific implementation manners of the present invention are disclosed above, and a person of ordinary skill in the art should understand that the disclosed content is not intended to limit the protection scope of the present invention. Any equivalent variation and modification made without departing from the concept and principle of the present invention shall fall within the protection scope of the present invention.

What is claimed is:

1. A method for unlocking a screen of an electronic device, wherein the electronic device comprises the screen and a storage unit, and the method for unlocking a screen of an electronic device comprises:
   detecting, in a screen-locked state, intent of a user to unlock the screen;
   if it is detected that the user intends to unlock the screen, extracting contact information from the storage unit of the electronic device, wherein the extracted contact information comprises a first attribute value and second attribute values;
   displaying the first attribute value of the extracted contact information on the screen and displaying the second attribute values in a selectable manner; and
   detecting an operation of choosing a second attribute value by the user, and comparing the second attribute value chosen by the user with a second attribute value that is in the storage unit and corresponding to the displayed first attribute value; if the two values are the same, unlocking the screen; and otherwise, maintaining the screen-locked state.

2. The method for unlocking a screen of an electronic device according to claim 1, wherein the intent of the user to unlock the screen comprises touching one or more physical keys on the electronic device.

3. The method for unlocking a screen of an electronic device according to claim 1, wherein the first attribute value and the second attribute value that are of the contact information comprise two of a name, a contact manner, a photo, and a relationship with the user.

4. The method for unlocking a screen of an electronic device according to claim 3, wherein the contact manner comprises a phone number, an email address or an instant messaging number.

5. The method for unlocking a screen of an electronic device according to claim 1, wherein the displayed first attribute values and second attribute values of the contact information are not quantitatively symmetric.

6. The method for unlocking a screen of an electronic device according to claim 1, wherein the selectable manner comprises a manner of a rolling wheel.

7. The method for unlocking a screen of an electronic device according to claim 6, wherein an input of choosing a second attribute value by the user comprises touching the rolling wheel, wherein the rolling wheel produces a rolling effect and sequentially displays the extracted second attribute values, wherein the input further comprises tapping a to-be-chosen second attribute value when the to-be-chosen second attribute value is displayed on the screen.

8. The method for unlocking a screen of an electronic device according to claim 7, wherein the contact information extracted from the storage unit of the electronic device further comprises third attribute values, wherein the third attribute values are displayed with the second attribute values in pairs.

9. The method for unlocking a screen of an electronic device according to claim 1, wherein the selectable manner comprises a manner of a drop down menu.

10. The method for unlocking a screen of an electronic device according to claim 9, wherein an input of choosing a second attribute value by the user comprises tapping the drop down menu, wherein the drop down menu displays the extracted second attribute values in a list, wherein the input further comprises tapping a second attribute value that is displayed in the drop down menu and is to be chosen by the user.

11. The method for unlocking a screen of an electronic device according to claim 1, further comprising: when the electronic device is in the locked state, preventing the electronic device from responding to any touch, on the screen, that is not corresponding to an action of matching contact attribute values.

12. The method for unlocking a screen of an electronic device according to claim 1, wherein the contact information are extracted from a predetermined contact group.

13. An electronic device, comprising:
   a storage unit;
   one or more processing units; and
   one or more modules, wherein the one or more modules are stored in the storage and configured to be executed by the one or more processors, and the one or more modules comprise instructions that are used to execute the following steps:
   setting the electronic device to a screen-locked state;
   detecting intent of a user to unlock a screen;

if it is detected that the user intends to unlock the screen, extracting multiple pieces of contact information from the storage unit of the electronic device, wherein each piece of the extracted contact information comprises a first attribute value and a second attribute value;

displaying a first attribute value of the extracted contact information on the screen and displaying the second attribute values in a selectable manner; and detecting an operation of choosing a second attribute value by the user, and comparing the second attribute value chosen by the user with a second attribute value that is in the storage unit and corresponding to the displayed first attribute value; if the two values are the same, unlocking the screen; and otherwise, maintaining the screen-locked state.

14. The electronic device according to claim 13, wherein the intent of the user to unlock the screen comprises touching one or more physical keys on the electronic device.

15. The electronic device according to claim 13, wherein the first attribute value and the second attribute value that are of the contact information comprise two of a name, a contact manner, a photo, and a relationship with the user.

16. The electronic device according to claim 15, wherein the contact manner comprises a phone number, an email address or an instant messaging number.

17. The electronic device according to claim 13, wherein the displayed first attribute values and second attribute values of the contact information are not quantitatively symmetric.

18. The electronic device according to claim 13, wherein the selectable manner comprises a manner of a rolling wheel.

19. The electronic device according to claim 18, wherein an input of choosing a second attribute value by the user comprises touching the rolling wheel, wherein the rolling wheel produces a rolling effect and sequentially displays the extracted second attribute values, wherein the input further comprises tapping a to-be-chosen second attribute value when the to-be-chosen second attribute value is displayed on the screen.

20. The electronic device according to claim 13, wherein the selectable manner comprises a manner of a drop down menu.

* * * * *

UNITED STATES PATENT AND TRADEMARK OFFICE
CERTIFICATE OF CORRECTION

PATENT NO. : 9,513,790 B2  
APPLICATION NO. : 14/584343  
DATED : December 6, 2016  
INVENTOR(S) : Zhu Liu et al.

Page 1 of 1

It is certified that error appears in the above-identified patent and that said Letters Patent is hereby corrected as shown below:

On the Title Page

In the Foreign Patent Documents  
Item (56), Page 2:  
Column 2, Line 17:  
After "CN 10288449" insert --8--, therefor.

Signed and Sealed this  
Sixteenth Day of May, 2017

Michelle K. Lee  
*Director of the United States Patent and Trademark Office*